US012333038B2

(12) United States Patent
Sabbatini et al.

(10) Patent No.: US 12,333,038 B2
(45) Date of Patent: Jun. 17, 2025

(54) RISK ASSESSMENT SYSTEM FOR IDENTIFYING DATA FILES WITH SENSITIVE INFORMATION

(71) Applicant: Upguard, Inc., Mountain View, CA (US)

(72) Inventors: Jacopo Sabbatini, Hobart (AU); Gregory Ford Pollock, San Jose, CA (US); Jonathan David Hendren, Sydney (AU); Daniel Bradbury, Sydney (AU); Michael Franz Baukes, Hobart (AU); Stephen Cossell, Auckland (NZ); Justin Glenn Lloyd, Gosford (AU)

(73) Assignee: Upguard, Inc., Mountain View, CA (US)

( * ) Notice: Subject to any disclaimer, the term of this patent is extended or adjusted under 35 U.S.C. 154(b) by 236 days.

(21) Appl. No.: 18/319,030

(22) Filed: May 17, 2023

(65) Prior Publication Data
US 2023/0409727 A1    Dec. 21, 2023

Related U.S. Application Data

(60) Provisional application No. 63/343,338, filed on May 18, 2022.

(51) Int. Cl.
*G06F 21/62*     (2013.01)
*G06F 16/9538*   (2019.01)

(52) U.S. Cl.
CPC ...... *G06F 21/6218* (2013.01); *G06F 16/9538* (2019.01)

(58) Field of Classification Search
CPC ............ G06F 21/6218; G06F 16/9538; G06F 21/577; G06F 21/6245; G06Q 10/0635; H04L 63/1433
See application file for complete search history.

(56) References Cited

U.S. PATENT DOCUMENTS

| | | | |
|---|---|---|---|
| 10,785,250 B2 * | 9/2020 | Linder | H04L 63/1433 |
| 11,757,914 B1 * | 9/2023 | Jakobsson | H04L 51/42 |
| | | | 726/25 |
| 12,229,308 B1 * | 2/2025 | Guerra | G06F 21/6245 |
| 2011/0023122 A1 * | 1/2011 | Doi | G06F 16/9535 |
| | | | 707/E17.014 |
| 2015/0261940 A1 * | 9/2015 | Roundy | G06Q 50/01 |
| | | | 726/26 |
| 2015/0302097 A1 * | 10/2015 | Focacci | G06F 16/35 |
| | | | 707/723 |

(Continued)

*Primary Examiner* — Matthew Smithers
(74) *Attorney, Agent, or Firm* — Fenwick & West LLP

(57) ABSTRACT

A system and method are provided for assessing whether data files contain sensitive information associated with an entity. The system stores search keywords associated with the entity, generates search terms based on the search keywords, and searches one or more online public databases for data files associated with each search term. The system then generates risk scores for data files in the search results indicating a likelihood that the data files contain information from a data breach associated with the entity. The system identifies data files that contain information from the data breach from the generated risk scores, and transmits a notification to the entity describing the identified data files.

20 Claims, 4 Drawing Sheets

(56) References Cited

U.S. PATENT DOCUMENTS

| | | | |
|---|---|---|---|
| 2017/0061345 A1* | 3/2017 | Jones, III | G06Q 50/01 |
| 2017/0236229 A1* | 8/2017 | Roof | G06Q 50/26 |
| | | | 705/345 |
| 2018/0246974 A1* | 8/2018 | Shukla | G06F 16/9535 |
| 2018/0248895 A1* | 8/2018 | Watson | G06N 7/01 |
| 2020/0167347 A1* | 5/2020 | Yu | G06F 16/9024 |
| 2020/0193284 A1* | 6/2020 | Nguyen | G06F 40/30 |
| 2021/0084063 A1* | 3/2021 | Triantafillos | H04L 67/535 |
| 2021/0157950 A1* | 5/2021 | Turano | G06F 21/6245 |
| 2024/0241752 A1* | 7/2024 | Crabtree | G06Q 10/067 |

* cited by examiner

"Smith Inc."
"1234 Main St"
"(650) 555-1234"
"Bank Account: 123456789"
— Search Keywords 200

"Smith Inc. (650) 555-1234"

"1234 Main St. Bank Account: 123456789"

"1234 Main St. Smith Inc."

"Bank Account: 123456789"

"Smith Inc. 1234 Main St. (650) 555-1234"

Search Terms
210

RISK ASSESSMENT SYSTEM FOR IDENTIFYING DATA FILES WITH SENSITIVE INFORMATION

CROSS-REFERENCE TO RELATED APPLICATIONS

This application claims the benefit of U.S. Provisional Patent Application No. 63/343,338, filed May 18, 2022, which is incorporated by reference.

BACKGROUND

People and organizations may store sensitive information in computing systems. If this information is made available to the public, there could be significant, detrimental impacts to the entity to whom the information belongs. For example, if a person's bank account information were made public, malicious actors could try to take money out of the person's bank account. Similarly, if an organization's customer list were made public, the organization could lose customers to competitors who try to undercut their prices.

Unfortunately, data breaches do occur on a regular basis, and frequently an entity does not know that a data breach occurs until after they experience negative consequences from their sensitive information being made public. To identify whether a data breach has occurred and what information, if any, has been leaked in a data breach, an entity may want to know whether their information has been made public in publicly available databases. However, it can be very difficult for an entity to check all publicly available databases for whether their information has been published in those places, simply because there is so much additional information for the entity to check. Thus, entities often have to wait until they suffer from the negative consequences of their sensitive information being made public before they know what information is available in the public.

SUMMARY

A risk assessment system identifies files on online public databases that may contain sensitive information that was leaked from an entity. The risk assessment system stores search keywords for an entity. Search keywords are keywords that describe characteristics of the entity. For example, if the entity is a person, the search keywords may include the person's name, their address, a PIN, bank account numbers, username, password, or personal identifying number (e.g., a Social Security Number). Similarly, if the entity is an organization, the search keywords for the entity may include the name of the organization, the names of members in the organization, bank account numbers associated with the members, or usernames or passwords associated with the organization or its members.

The risk assessment system generates search terms for an entity based on the search keywords and searches online public databases based on these search terms. A search term for an entity is a combination of search keywords associated with that entity. For example, a search term for a person-entity may include their last name, their address, and their username without including their password or personal identifying number. The risk assessment system uses these search terms to generate search results for the entity based on the data files that the risk assessment system receives through searching the online public databases using the search terms.

The risk assessment system generates a risk score for each data file in the search results. A risk score indicates a likelihood that the data file includes information that came from a data breach associated with the entity. The risk assessment system generates the risk scores by applying a risk scoring model to the set of search results. The risk assessment system identifies data files from the search results that contain information from the data breach based on the generated risk scores and transmits a notification to the entity describing the identified files.

By using search terms generated based on search keywords that are associated with an entity, a risk assessment system can quickly and effectively identify data files that may contain information from an entity's data leak without releasing other private information about the entity. The risk assessment system can also quickly identify data leaks that an entity has experienced before the entity may ordinarily discover the leak, thereby allowing the entity to address issues that may arise from a data leak before the issues actually occur.

BRIEF DESCRIPTION OF THE DRAWINGS

Figure (FIG. 1 illustrates an example system environment for a risk assessment system 130, in accordance with some embodiments.

DETAILED DESCRIPTION

Figure 1:
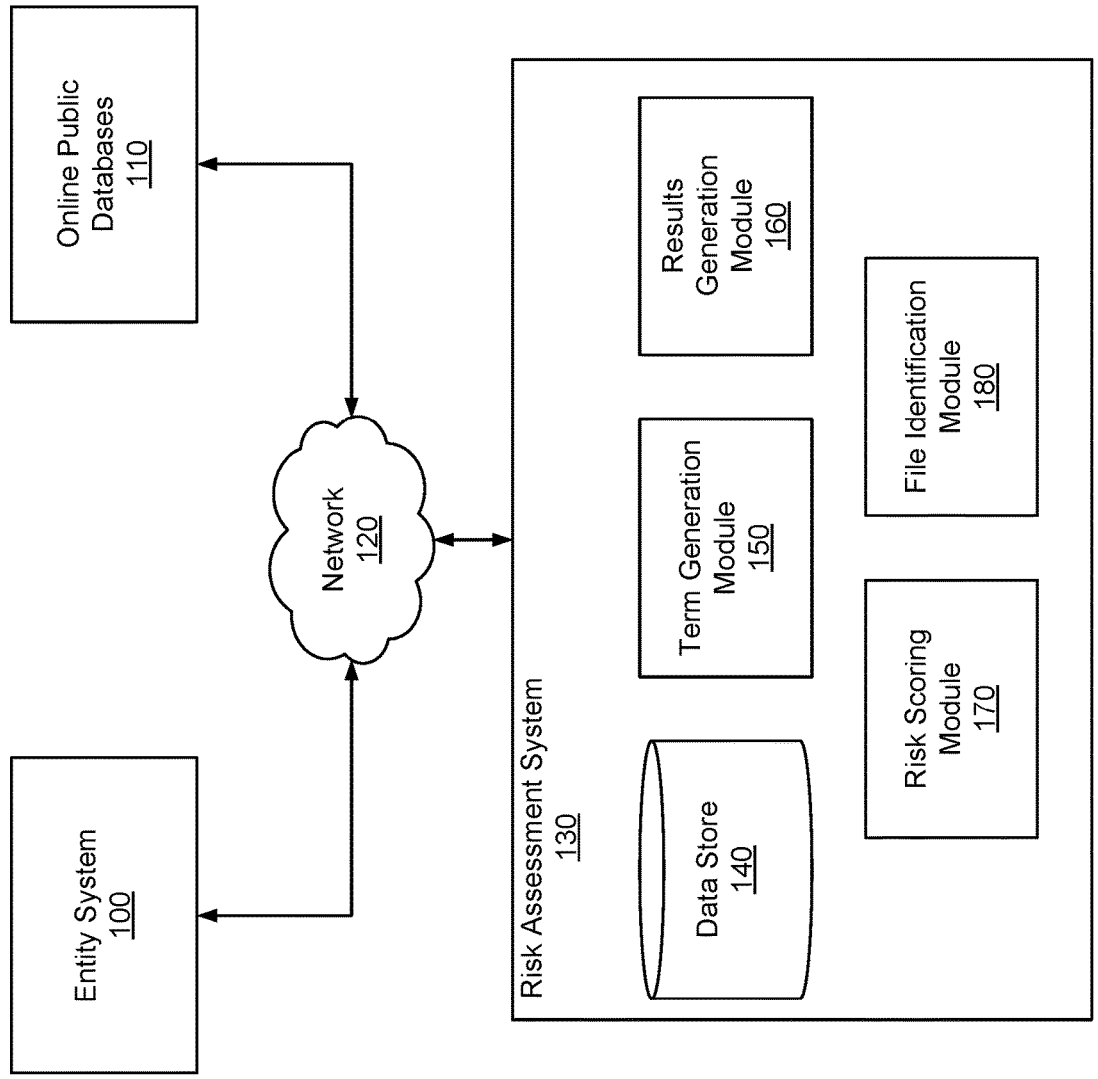

FIG. 1 illustrates an example system environment for a risk assessment system 130, in accordance with some embodiments. The system environment illustrated in FIG. 1 includes an entity system 100, one or more public databases 110, a network 120, and a risk assessment system 130. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

An entity system 100 is an online computing system that is associated with an entity. An entity may be a person or an organization (e.g., a business, a charity, or a school). The entity system 100 may store data used by the entity. The data stored by the entity system 100 may include sensitive information that the entity does not want made public. For example, for a person-entity, the sensitive information may include a personal identifier (e.g., a Social Security Number), a bank account number, a home address, or health information. For an organization-entity, the sensitive information may include organization financial information, employee information, customer information or patient information. The entity system 100 may be a system that is operated by the entity or by a third-party on behalf of the entity.

The entity system 100 may suffer from a data breach. A data breach is an incident when data stored by the entity system 100 is copied, taken, or made public without the entity's knowledge or authorization. A data breach may be caused by a malicious hacker who achieves unauthorized access to information stored by the entity system 100 or may be caused unintentionally by the entity or its agent accidentally making information available to the public. Data breaches may include malware placed on the entity system 100, a device with access to the entity system 100 being lost or stolen or an unintentional or intentional disclosure of information to a third party.

An online public database 110 is an online system that stores information and makes the information available to the public (e.g., through a website or an API). An online public database 110 may restrict access to users who have an account with the online public database 110 or may allow information to be openly accessed by anyone who visits a website associated with the online public database 110. The online public database 110 may associate information with users who provide information to the online public database 110. An online public database 110 may store information as a data file. A data file is a set of data stored together based on a file format. For example, a data file may be a TXT, DOCX, PDF, XLSX, SQL, CSV, or ZIP file.

In some embodiments, the online public databases 110 may include search functionality that allows users to search through the information stored by the online public database 110. For example, an online public database 110 may allow a user to input a search query and the online public database 110 may generate search results for the user based on the search query. Additionally, an online public database 110 may provide an index by which a user can browse through the information stored by the online public database 110.

An online public database 110 may store information from the entity system 100 that was made available to the public due to a data breach. For example, a user of an online public database 110 may be a malicious actor who executed a data breach on the entity system 100, and may provide data files with sensitive information from the entity system 100 to the online public database 110 to be made available to the public.

The entity system 100, online public databases 110, and the risk assessment system 130 may communicate with each other via the network 120, which may comprise any combination of local area and wide area networks employing wired or wireless communication links. In some embodiments, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

FIG. 1 also illustrates an example system architecture of a risk assessment system 130, in accordance with some embodiments. The risk assessment system 130 illustrated in FIG. 1 includes a data store 140, a term generation module 150, a results generation module 160, a risk scoring module 170, and a file identification module 180. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The data store 140 stores data used by the risk assessment system 130 to identify data files on online public databases 110 that are likely to contain sensitive information from an entity. For example, the data store 140 may store a copy of sensitive information from the entity system 100 to use as a comparison for identifying data files. Additionally, the data store 140 may store machine-learning models used by the risk assessment system to identify data files.

The data store 140 stores search keywords for an entity. Search keywords are keywords that describe characteristics of the entity. For example, if the entity is a person, the search keywords may include the person's name, their address, a PIN, bank account numbers, username, password, or personal identifying number (e.g., a Social Security Number). Similarly, if the entity is an organization, the search keywords for the entity may include the name of the organization, the names of members in the organization, bank account numbers associated with the members, or usernames or passwords associated with the organization or its members. Search keywords also may include website domains, mail domains, API endpoints, or IP addresses associated with the entity.

The term generation module 150 generates search terms for the entity that the risk assessment system 130 may use to identify data files with sensitive information from the entity system 100. A search term for an entity is a combination of search keywords associated with that entity. For example, a search term for a person-entity may include their last name, their address, and their username without including their password or personal identifying number. The term generation module 150 may apply term generation rules when generating search terms for an entity. A term generation rule is a constraint on which search keywords may or may not be included in a search term. For example, a term generation rule may require that certain search keywords be included, such as a person's name or username.

The results generation module 160 generates search results for the entity based on the search terms generated by the term generation module 150. The results generation module 160 may use the generated search terms to search through online public databases 110 to find data files that match the generated search terms. For example, the results generation module 160 may use a search functionality of an online public database 110 to have the online public database 110 generate a set of search results. Similarly, the results generation module 160 may use the search terms to identify data files on online public databases 110 that may be relevant to the entity. The results generation module 160 may aggregate search results from each of the search terms into an aggregated set of search results for the entity. In some embodiments, the results generation module 160 downloads a set of data files from an online public database 110 and locally searches the downloaded data files. The results generation module 160 may generate search results from the downloaded set of data files based on search terms generated by the term generation module 150.

The risk scoring module 170 generates risk scores for each data file in the generated search results. A risk score represents a likelihood that a data file contains sensitive information from an entity's data breach. The risk scoring module 170 may use a risk scoring model to generate a risk score for each data file in the generated search results. A risk scoring model is a machine-learning model (e.g., a neural network) that is trained to generate a risk score for a data file. For example, the risk scoring model may include a transformer model that is trained to generate a risk score for a data file by performing natural language processing on a data file. The risk scoring module 170 may train the risk scoring model based on a set of training examples. Each training example may include an example data file and a label indicating whether the data file contains sensitive information from a data breach. The risk scoring module 170 may iteratively train the risk scoring model by applying the risk scoring model to each data file the training examples and comparing the output of the risk scoring model to the label.

In some embodiments, the risk scoring module 170 uses a set of machine-learning models to generate risk scores for data files. For example, the risk scoring module 170 may use a file typing model to identify a file type for a data file. A file typing model is a machine-learning model (e.g., a neural network) that is trained to identify a data file type for a data file. File types may describe how the data file is formatted, such as whether the file is a TXT, DOCX, PDF, XLSX, SQL, CSV, or ZIP file. Additionally, file types may describe what kind of information is stored in the file, such as whether the file contains financial information, health information, or employment information.

The risk scoring module 170 may then use risk scoring models that are trained to generate risk scores for data files of an associated file type. The risk scoring module 170 may use a risk scoring model for each file type. The risk scoring model for a file type may be trained to generate risk scores for data files of the associated file type. For example, the data store 140 may store a risk scoring model that is trained to generate risk scores for PDF files that contain financial information. The risk scoring module 170 may apply a risk scoring model to each data file in the search results based on the file type of each data file and thereby generate risk scores for the data files in the search results.

The file identification module 180 identifies which, if any, of the data files from the search results contain sensitive information from a data breach. For example, the file identification module 180 may identify data files associated with risk scores that exceed a risk score threshold as data files that likely contain sensitive information from a data breach. Similarly, the file identification module 180 may rank data files by their risk scores to identify data files that likely contain sensitive information.

The file identification module 180 may transmit the identified files to the entity system 100, identifying the data files as files that likely contain sensitive information. The file identification module 180 may include information describing the likelihood that the file contains sensitive information, which online public database 110 each data file was retrieved from, or what information is known about whoever provided the data file to the online public database 110. In some embodiments, the file identification module 180 transmits a ranking of the data files to the entity system 100.

Figure 2A:
FIGS. 2A and 2B illustrate an example data flow where search keywords are used to identify data files that are likely to contain sensitive information, in accordance with some embodiments.
Figure 2B:
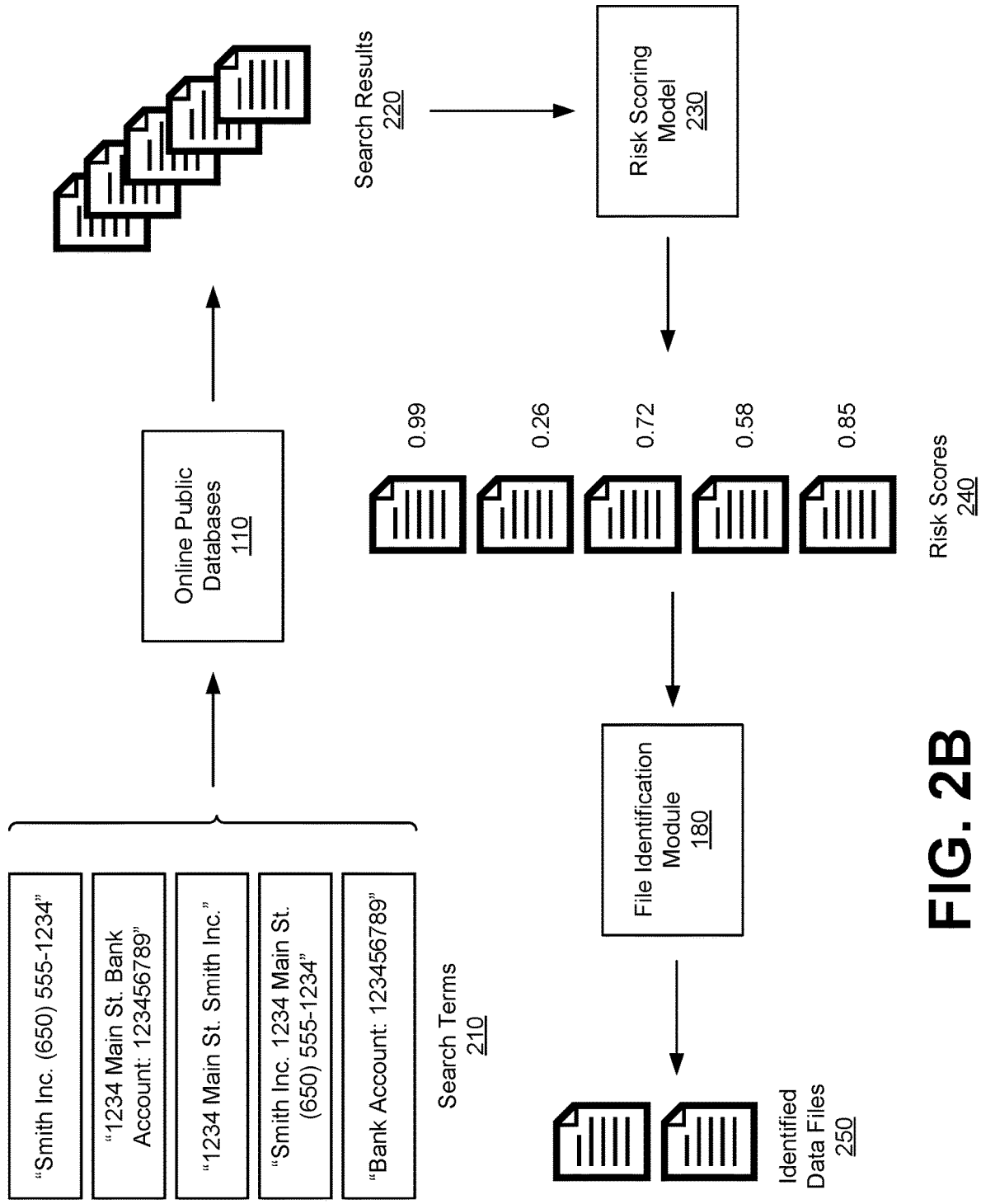

FIGS. 2A and 2B illustrate an example data flow where search keywords 200 are used to identify data files that are likely to contain sensitive information, in accordance with some embodiments. FIG. 2A illustrates a set of search terms 210 that are generated based on a set of search keywords 200 that are associated with an entity. In FIG. 2B, those search terms 210 are transmitted to an online public database 110 to be used to generate search results 220. As illustrated, the search results 220 may include a set of data files from the online public database 110. The risk assessment system may apply a risk scoring model 230 to the search results 220 to generate risk scores 240 for each data file in the search results 220. The risk scores 240 may indicate a likelihood that each file contains information from the entity that was part of a data breach. The file identification module 180 identifies data files 250 that are likely to contain information from a data leak based on the risk scores 240, and may transmit a notification to the entity describing the identified data files 250.

Figure 3:
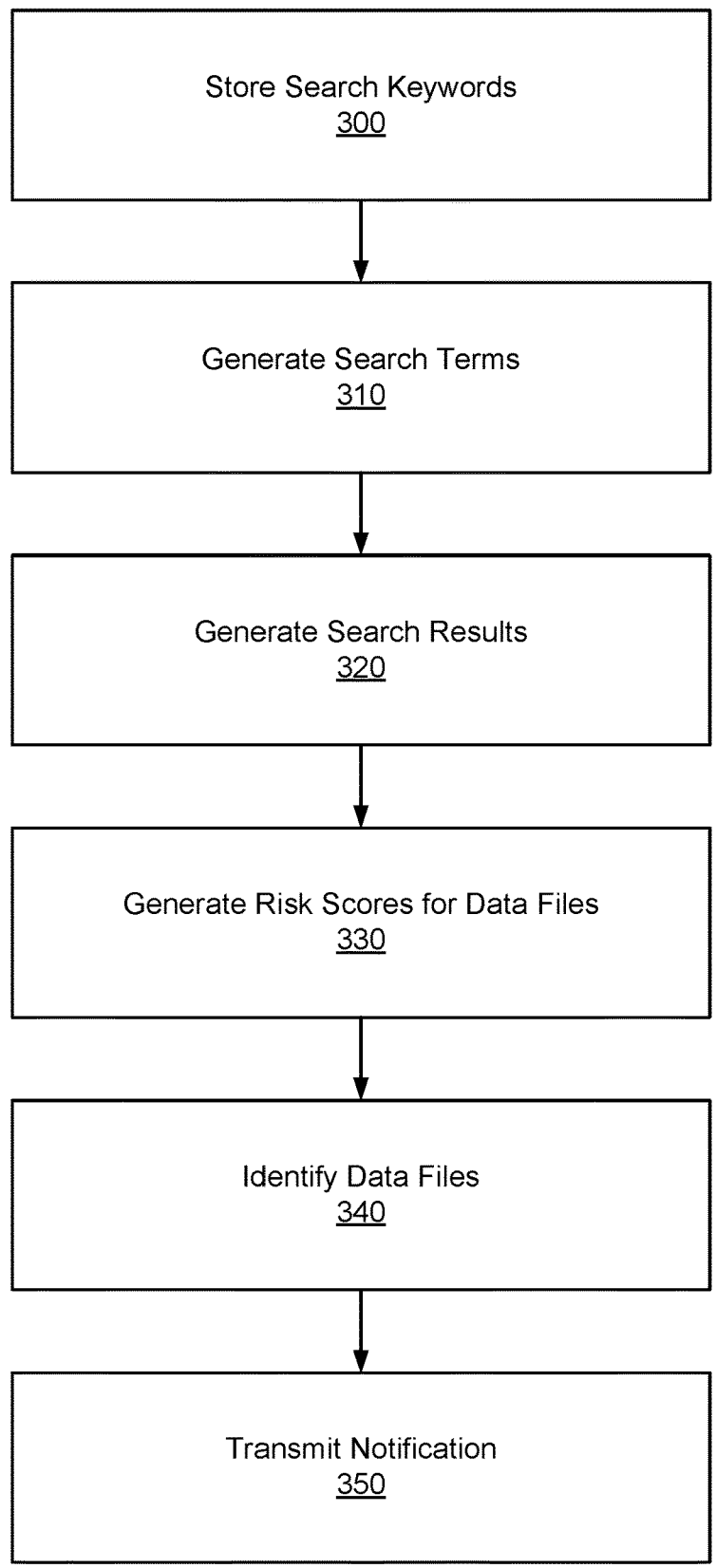
FIG. 3 is a flowchart for a method of assessing whether data files contain sensitive information for an entity, in accordance with some embodiments.

FIG. 3 is a flowchart for a method of assessing whether data files contain sensitive information for an entity, in accordance with some embodiments. Alternative embodiments may include more, fewer, or different steps from those illustrated in FIG. 3, and the steps may be performed in a different order from that illustrated in FIG. 3. Additionally, each of these steps may be performed automatically by the risk assessment system without human intervention.

The risk assessment system stores 300 search keywords for an entity. Each search keyword may describe a characteristic of the entity. The risk assessment system generates 310 search terms based on the search keywords. Each search term may include a different combination of one or more of the search keywords. The risk assessment system may generate the search terms based on term generation rules that apply constraints on which search keywords may or may not be included in a search term.

The risk assessment system generates 320 search results based on the search terms by searching online public databases based on the search terms. The search results may include data files stored by the online public databases. The risk assessment system generates 330 risk scores for the data files in the search results. A risk score may indicate a likelihood that a data file includes information from a data breach of the entity. The risk assessment system may generate the risk scores by applying a risk scoring model to the data files.

The risk assessment system identifies 340 data files that contain information from a data breach based on the generated risk scores and transmits 350 a notification to the entity describing the identified data files.

ADDITIONAL CONSIDERATIONS

The foregoing description of the embodiments has been presented for the purpose of illustration; it is not intended to be exhaustive or to limit the patent rights to the precise pages disclosed. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising:
   storing a plurality of search keywords associated with an entity, wherein the plurality of search keywords comprises search keywords describing characteristics of the entity;
   generating a plurality of search terms based on the plurality of search keywords, wherein each search term of the plurality of search terms comprises a different combination of one or more search keywords from the plurality of search keywords;
   generating a set of search results by searching one or more online public databases based on each of the one or more search terms, wherein the set of search results comprises a set of data files stored by the one or more online public databases;
   generating a risk score for each data file in the set of data files by applying a risk scoring model to the set of search results, wherein a risk score for a data file indicates a likelihood that the data file comprises information that came from a data breach associated with the entity;
   identifying, based on the generated risk scores for the set of data files, one or more data files of the set of data files that contain information from the data breach; and
   transmitting a notification to the entity describing the identified one or more data files.

2. The method of claim 1, wherein the entity is one of a person-entity or an organization-entity.

3. The method of claim 1, wherein the plurality of search terms is generated based on a set of term generation rules, wherein each term generation rule comprises a constraint on which search keywords of the plurality of search keywords may be included in a search term.

4. The method of claim 1, wherein searching the one or more online public databases comprises:
   transmitting the plurality of search terms to an online public database; and
   receiving a set of search results from the online public database.

5. The method of claim 1, wherein searching the one or more online public databases comprises searching an indexed set of data files stored by an online public database.

6. The method of claim 1, wherein generating the set of search results comprises aggregating search results from each online public database of the one or more online public databases.

7. The method of claim 1, wherein the risk scoring model comprises a transformer.

8. The method of claim 1, wherein generating a risk score for each data file in the set of data files comprises:
   identifying a file type of each data file in the set of data files; and generating a risk score for each data file in the set of data files by applying the risk scoring model to each data file and to the file type of each data file.

9. The method of claim 8, wherein identifying the file type of each data file comprises applying a file type model to the data file, wherein the file type model is a machine-learning model that is trained to identify a file type of a data file.

10. The method of claim 8, wherein generating a risk score for each data file in the set of data files comprises applying a risk scoring model of a set of risk scoring models to the data file, wherein the risk scoring model is selected from the set of risk scoring models based on the file type of the data file.

11. A non-transitory, computer-readable medium storing instructions that, when executed by a processor, cause the processor to:
   store a plurality of search keywords associated with an entity, wherein the plurality of search keywords comprises search keywords describing characteristics of the entity;
   generate a plurality of search terms based on the plurality of search keywords, wherein each search term of the plurality of search terms comprises a different combination of one or more search keywords from the plurality of search keywords;
   generate a set of search results by searching one or more online public databases based on each of the one or more search terms, wherein the set of search results comprises a set of data files stored by the one or more online public databases;
   generate a risk score for each data file in the set of data files by applying a risk scoring model to the set of search results, wherein a risk score for a data file indicates a likelihood that the data file comprises information that came from a data breach associated with the entity;
   identify, based on the generated risk scores for the set of data files, one or more data files of the set of data files that contain information from the data breach; and
   transmit a notification to the entity describing the identified one or more data files.

12. The computer-readable medium of claim 11, wherein the entity is one of a person-entity or an organization-entity.

13. The computer-readable medium of claim 11, wherein the instructions that cause the processor to generate the plurality of search terms further cause the processor to: generate the plurality of search terms based on a set of term generation rules, wherein each term generation rule comprises a constraint on which search keywords of the plurality of search keywords may be included in a search term.

14. The computer-readable medium of claim 11, wherein the instructions that cause the processor to search the one or more online public databases further cause the processor to:
   transmit the plurality of search terms to an online public database; and
   receive a set of search results from the online public database.

15. The computer-readable medium of claim 11, wherein the instructions that cause the processor to search the one or more online public databases further cause the processor to:
   search an indexed set of data files stored by an online public database.

16. The computer-readable medium of claim 11, wherein the instructions that cause the processor to generate the set of search results further cause the processor to aggregate search results from each online public database of the one or more online public databases.

17. The computer-readable medium of claim 11, wherein the risk scoring model comprises a transformer.

18. The computer-readable medium of claim 11, wherein the instructions that cause the processor to generate a risk score for each data file in the set of data files further cause the processor to:
   identify a file type of each data file in the set of data files; and
   generate a risk score for each data file in the set of data files by applying the risk scoring model to each data file and to the file type of each data file.

19. The computer-readable medium of claim 18, wherein the instructions that cause the processor to identify the file type of each data file further cause the processor to: apply a file type model to the data file, wherein the file type model is a machine-learning model that is trained to identify a file type of a data file.

20. The computer-readable medium of claim 18, wherein the instructions that cause the processor to generate a risk score for each data file in the set of data files further cause the processor to apply a risk scoring model of a set of risk scoring models to the data file, wherein the risk scoring model is selected from the set of risk scoring models based on the file type of the data file.

* * * * *